United States Patent [19]

Dunne

[11] Patent Number: 6,102,107

[45] Date of Patent: Aug. 15, 2000

[54] APPARATUS FOR USE IN SORPTION COOLING PROCESSES

[75] Inventor: Stephen R. Dunne, Algonquin, Ill.

[73] Assignee: UOP LLC, Des Plaines, Ill.

[21] Appl. No.: 09/210,333

[22] Filed: Dec. 11, 1998

[51] Int. Cl.[7] .................................................. F28D 15/00
[52] U.S. Cl. .................... 165/104.12; 165/133; 165/151; 62/480
[58] Field of Search .............................. 165/104.12, 133, 165/151, 182, 104.11; 62/477, 480

[56] References Cited

U.S. PATENT DOCUMENTS

| | | | |
|---|---|---|---|
| 4,138,850 | 2/1979 | Tchernev | 60/641 |
| 4,548,046 | 10/1985 | Brandon et al. | 62/79 |
| 4,637,218 | 1/1987 | Tchernev | 62/106 |
| 5,038,581 | 8/1991 | Maier-Laxhuber et al. | 62/480 X |
| 5,054,544 | 10/1991 | Maier-Laxhuber et al. | 165/104.12 |
| 5,388,637 | 2/1995 | Jones et al. | 165/104.12 |
| 5,456,093 | 10/1995 | Dunne et al. | 165/104.12 X |
| 5,477,705 | 12/1995 | Meunier | 62/480 |
| 5,518,977 | 5/1996 | Dunne et al. | 502/68 |
| 5,585,145 | 12/1996 | Maier-Laxhuber et al. | 427/380 |
| 5,603,377 | 2/1997 | Fujii et al. | 165/907 X |
| 5,650,221 | 7/1997 | Belding et al. | 442/417 |
| 5,687,473 | 11/1997 | Tokura | 29/727 |

FOREIGN PATENT DOCUMENTS

| | | | |
|---|---|---|---|
| 636013 | 9/1936 | Germany | 165/104.12 |
| 53-68448 | 3/1978 | Japan | 165/104.12 |
| 0101489 | 6/1985 | Japan | 165/104.12 |
| 0103297 | 6/1985 | Japan | 165/104.12 |
| 403140760 | 6/1991 | Japan | 62/480 |
| 406002984 | 1/1994 | Japan | 62/480 |
| 094011685 | 5/1994 | WIPO | 62/480 |

*Primary Examiner*—Christopher Atkinson
*Attorney, Agent, or Firm*—John G. Tolomei; Richard P. Silverman

[57] ABSTRACT

A sorption cooling exchanger module and a process for its use in sorption cooling processes is described. The apparatus, provides high efficiency sorption cooling operations by maintaining a characteristic diffusion distance between fin plates such that the sorption cooling process can be carried out with short cycle times which increase the efficiency of the sorption cooling process and increases the specific power. The apparatus comprises an adsorption zone comprising an adsorbent layer comprising a coating of adsorbent or comprising a paper layer containing a selective adsorbent. For sorption cooling processes, the heat transfer zone is disposed in tubes disposed normal to the fin plates. The apparatus provides an opportunity to provide an adsorber/generator module having a high fin plate density per unit length of tube without the characteristic diffusion distance becoming equal to the height of the fin from the tube resulting in an improvement in efficiency.

29 Claims, 1 Drawing Sheet

APPARATUS FOR USE IN SORPTION COOLING PROCESSES

FIELD OF THE INVENTION

The present invention relates to an apparatus for use in adsorption processes. More particularly, the present invention relates to the use of a layer of solid adsorbent disposed on a flat plate to perform adsorption and desorption based sorption cooling processes.

BACKGROUND OF THE INVENTION

Sorption cooling processes typically employ some adsorbent disposed in a metal vessel and on a metal screen or surface which provides support for the adsorbent and permits the adsorbent to be placed in contact with the fluid stream containing the adsorbable component over the range of conditions necessary for the adsorption and desorption. The metal structures and physical arrangement of these devices has placed certain process limitations which restrict the amount of adsorbent which actually comes in contact with the fluid stream, or is accompanied by heat transfer inefficiencies inherent in the disposition of the adsorbent.

In the operation of sorption cooling systems, generally there are two or more solid beds containing a solid adsorbent. The solid adsorbent beds desorb refrigerant when heated and adsorb refrigerant vapor when cooled. In this manner the beds can be used to drive the refrigerant around a heat pump system to heat or cool another fluid such as a process stream or to provide space heating or cooling. In the heat pump system, commonly referred to as the heat pump loop, or a sorption refrigeration circuit, the refrigerant is desorbed from a first bed as it is heated to drive the refrigerant out of the first bed and the refrigerant vapor is conveyed to a condenser. In the condenser, the refrigerant vapor is cooled and condensed. The refrigerant condensate is then expanded to a lower pressure through an expansion valve and the low pressure condensate passes to an evaporator where the low pressure condensate is heat exchanged with the process stream or space to be conditioned to revaporize the condensate. When further heating no longer produces desorbed refrigerant from the first bed, the first bed is isolated and allowed to return to the adsorption conditions. When the adsorption conditions are established in the first bed, the refrigerant vapor from the evaporator is reintroduced to the first bed to complete the cycle. Generally two or more solid adsorbent beds are employed in a typical cycle wherein one bed is heated during the desorption stroke and the other bed is cooled during the adsorption stroke. The time for the completion of a fall cycle of adsorption and desorption is known as the "cycle time." The upper and lower temperatures will vary depending upon the selection of the refrigerant fluid and the adsorbent. Some thermodynamic processes for cooling and heating by adsorption of a refrigerating fluid on a solid adsorbent use zeolite and other sorption materials such as activated carbon and silica gel. U.S. Pat. No. 4,138,850 relates to a system for solar heat utilization employing a solid zeolite adsorbent mixed with a binder, pressed, and sintered into divider panels and hermetically sealed in containers. The U.S. Pat. No. 4,637,218 to Tchernev relates to a heat pump system using zeolites as the solid adsorbent and water as the refrigerant wherein the zeolite is sliced into bricks or pressed into a desired configuration to establish an hermetically sealed space and thereby set up the propagation of a temperature front, or thermal wave through the adsorbent bed. The bricks used in U.S. Pat. No. 4,637,218 are preferably not more than 10 mm in thickness. U.S. Pat. No. 5,477,705 discloses an apparatus for refrigeration employing a compartmentalized reactor and alternate circulation of hot and cold fluids to create a thermal wave which passes through the compartments containing a solid adsorbent to desorb and adsorb a refrigerant. U.S. Pat. No. 4,548,046 relates to an apparatus for cooling or heating by adsorption of a refrigerating fluid on a solid adsorbent. The operations employ a plurality of tubes provided with parallel radial fins, the spaces between which are filled or covered with solid adsorbent such as Zeolite 13X located on the outside of the tubes. U.S. Pat. No. 5,518,977 to Dunne et. al., which is hereby incorporated by reference, relates to sorption cooling devices which employ adsorbent coated surfaces to obtain a high cooling coefficient of performance.

U.S. Pat. No. 5,585,145 discloses a method for providing an adsorbent coating on a heat exchanger which comprises applying a flowable emulsion including a binder agent, water and a solid adsorbent material to the surface of the heat exchanger. The disclosure states that the binder can be an adhesive and that the thickness of the adsorbent coating can be dipped, painted or sprayed with a drying step comprising heating the layer at temperatures greater than 150° C. in order to obtain a durable adsorbent coating structure.

All of the methods for coating assembled tube and plate heat exchangers to date suffer from the problem of uneven build up of the adsorbent coating. That is, in dipped, sprayed, or painted based coating methods, the emulsion or slurry comprising the adsorbent typically flows to a base or root point where the plate is joined to the tube, where the adsorbent layer is thicker than desired. For example, when finned tubes are coated by a dipping or spraying technique, the adsorbent slurry covers the fins and accumulates at the lowest point or where the fin and tube surfaces are joined. In some sorption cooling applications which employ a thermal wave approach, such as disclosed in U.S. Pat. No. 4,548,046 to Jones et al, the accumulation of adsorbent between the fined surface of the tube is desired to form an adsorbent/fin matrix. However, in sorption cooling processes where it is required to achieve a uniform temperature gradient in the adsorber or the generator of a sorption cooling system in order to operate with rapid cycles and achieve high efficiencies, better methods are sought to obtain a uniform adsorbent coating which does not suffer from a root buildup of adsorbent.

It is a still further object of this invention to provide an adsorbent module which is mechanically simpler to operate and is less costly to construct than fixed bed adsorbers and rotating desiccant wheels.

It is the object of the instant invention to provide an improved sorption cooling system for use in waste heat recovery, space heating, and air conditioning systems which is not limited by the regeneration efficiency of the adsorbent.

SUMMARY OF THE INVENTION

The present invention relates to a highly efficient sorption cooling module apparatus for use in sorption cooling processes which can be used effectively with a rapid cooling and heating cycle. The sorption cooling module of the present invention employs a uniform adsorbent coating on a fin plate surface which does not build up on heat transfer medium tubes passing through the fin plates even in a dense plate configuration. The result is a sorption cooling module with a high plate density and a high adsorbent to metal ratio which permits the sorption cooling processes using this module to operate at a coefficient of performance, COP, greater than about 0.6. One novel aspect of the sorption cooling module is the uniform adsorbent coating which is applied prior to assembly of the sorption cooling module. In one embodiment, the coating is a applied to the fin plates by conventional coating methods such as slip coating, spray coating, curtain coating, coil coating or electrically assisted coating methods to achieve a uniform surface coating on a first side and a second side, opposite, of the fin plates. Another novel aspect of the present invention is the lamination of an adsorbent paper to the first and second sides of the fin plates prior to the assembly of the sorption cooling module to achieve the uniform surface coating. Surprisingly, assembly of sorption cooling modules of the present invention results in modules having a greater effective density of adsorbent than can be achieved by coating the inside of tubes, coating the outside of finned tubes or even coating the outside of fin-tube exchangers. The effective density of a paper coated fin plate module was found to be almost 6–10 times greater than coated finned tubes. By avoiding the closure of the space between the fin plates of the sorption cooling module of the present invention, the sorption cooling cycle time is reduced; the efficiency of the sorption cooling module is increased; and the specific power of the sorption cooling module is increased.

In one embodiment, the present invention relates to a sorption cooling exchanger module comprising a plurality of fin plates. Each of the fin plates has a first and second opposing sides and an adsorbent coating covering essentially the entire surface of each opposing side. The fin plates are spaced apart in a stacked arrangement that eliminates contact between coated surfaces and contains at least 300 plates for every meter of the stack. A plurality of tubes extends through openings in the fin plates wherein the outside of the tube directly contacts the periphery of the openings to form the sorption cooling exchanger module and define a first flow path for a heat exchange medium in the tubes and a second flow path for a refrigerant between the coated fin plates. It is preferred that the adsorbent coating has a thickness of from about 0.13 mm to about 0.5 mm (0.005 to 0.020 inches) and the coated surfaces are separated by a distance of at least about 0.25 mm(0.01 inches).

In another embodiment, the present invention relates to a sorption cooling exchanger module comprising a plurality of fin plates. Each of the fin plates has a first and a second opposing side and an adsorbent coating covering essentially the entire surface of each opposing side. A plurality of holes is defined by the fin plates and extends through the fin plates and coating. A plurality of tubes which have uncoated outer walls extend transversely through the fin plates and have direct contact with the fin plates. The fin plates are spaced apart in a stacked arrangement that eliminates contact between coated surfaces. The stacked arrangement contains at least 300 plates for every meter of the stack. The plurality of tubes which extend through openings in the fin plates such that the outside of the tube directly contact the periphery of the openings to form the sorption cooling exchanger module and define a first flow path for a heat exchange medium in the tubes and a second flow path for a refrigerant between the coated fin plates.

In further embodiment, the present invention relates to a process for continuous sorption cooling using at least two sorption cooling exchanger modules described herein above. The process comprising passing a hot heat transfer stream to a first sorption cooling exchanger module of at least two sorption cooling exchanger modules to desorb a refrigerant from an adsorbent layer containing an adsorbent selective for the adsorption of the refrigerant to provide a refrigerant vapor stream. The refrigerant vapor stream at a desorption pressure is withdrawn from the first sorption cooling exchanger module and the refrigerant vapor stream is passed to a condenser. In the condenser the refrigerant vapor stream is cooled and at least partially condensed to provide a condensed refrigerant stream. The condensed refrigerant stream is passed to an isolation valve to reduce the pressure of the condensed refrigerant stream to an evaporator pressure to provide a cooled condensed refrigerant stream. The cooled condensed refrigerant stream is passed to an evaporator wherein the cooled condensed refrigerant stream is heat exchanged with an external stream to cool the external stream to provide a vaporized refrigerant stream. A cold heat transfer stream is passed to the heat transfer zone of another sorption cooling exchanger module to cool the adsorbent layer. The vaporized refrigerant stream is passed to the other sorption cooling exchanger module to adsorb the vaporized refrigerant stream. The above steps are repeated to provide a continuous sorption cooling process.

DETAILED DESCRIPTION OF THE INVENTION

Figure 1:
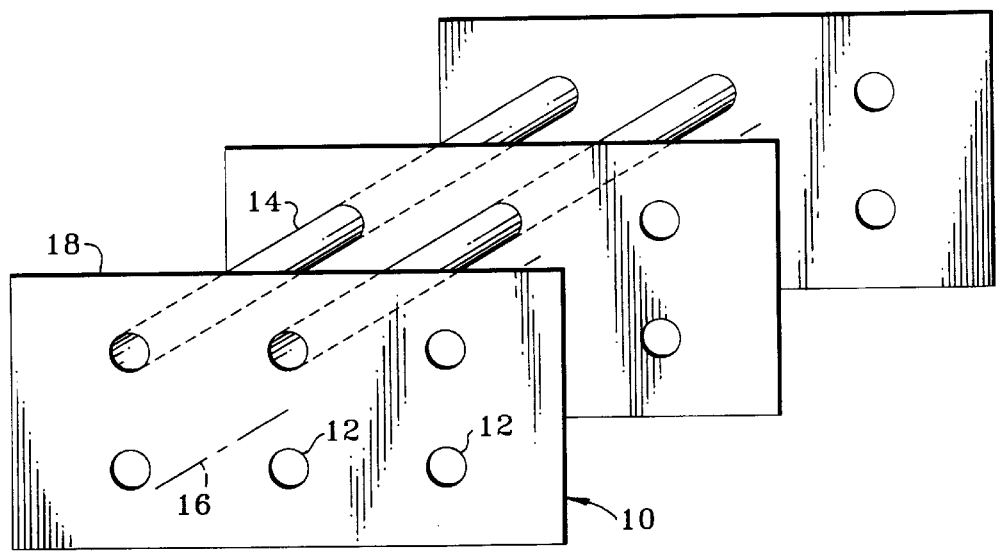
FIG. 1 is a perspective view of a sorption cooling module of the present invention.

In the present invention the adsorption zone is comprised of thin sheets of adsorbent paper layers bonded to flat plates. The adsorbent paper layers are in intimate contact with a heat transfer zone. For sorption cooling processes, the adsorption zone comprises a plurality of such plates disposed on tubes to form a tube and flat plate heat exchanger. The adsorbent layer comprises an adsorbent paper layer. An example of the type of adsorbent paper layer for use in the present invention is disclosed in U.S. Pat. No. 5,650,221 to Belding et al which is hereby incorporated by reference. The adsorbent paper layer of U.S. Pat. No. 5,650,221 is comprised of an improved support material, fibrous material, binders, and high levels of desiccant or adsorbent material. The fibrous material include cellulosic fibers, synthetic fibers and mixtures thereof. Fibrillated fibers, that is, fiber shafts which are split at their ends to form fibrils, i.e., fine fibers or filaments much finer than the fiber shafts are preferred. Examples of fibrillated, synthetic organic fibers useful in the adsorbent paper of the present invention are fibrillated aramid and acrylic fibers. A particularly preferred example of such a fiber is available from E.I. du Pont de Nemours & Company under the designation KEVLAR®. The desiccant or adsorbent may be incorporated therein during fabrication of the paper, or the paper may be formed and the desiccant or adsorbent coated thereon, or a combination of adsorbent incorporation during paper making and coating with adsorbent thereafter may be used. Preferably, the adsorbent paper of the present invention comprises a thickness of from about 5 mils (0.13 mm) to about 20 mils (0.5 mm) and comprises at least 50 percent adsorbent. More preferably, the adsorbent paper comprises from about 10 mils (0.25 mm) to about 20 mils (0.5 mm) in thickness and comprises more than about 70 weight percent adsorbent. The adsorbent can be any material capable of adsorbing an adsorbable component such as a refrigerant. The adsorbent may comprise powdered solid, crystalline compounds capable of adsorbing and desorbing the adsorbable compound. Examples of such adsorbents include silica gels, activated aluminas, activated carbon, molecular sieves and mixtures thereof. Molecular sieves include zeolite molecular sieves. Other materials which can be used as adsorbents include halogenated compounds such as halogen salts including chloride, bromide, and fluoride salts as examples. The preferred adsorbents are zeolites. Preferably, at least 70 weight percent of the adsorbent paper is a zeolite molecular sieve.

The pore size of the zeolitic molecular sieves may be varied by employing different metal cations. For example, sodium zeolite A has an apparent pore size of about 4 Å units, whereas calcium zeolite A has an apparent pore size of about 5 Å units. The term "apparent pore size" as used herein may be defined as the maximum critical dimension of the molecular sieve in question under normal conditions. The apparent pore size will always be larger than the effective pore diameter, which may be defined as the free diameter of the appropriate silicate ring in the zeolite structure. Zeolitic molecular sieves in the calcined form may be represented by the general formula:

$$Me_{2/n}O:Al_2O_3:xSiO_2:yH_2O$$

where Me is a cation, x has a value from about 2 to infinity, n is the cation valence and y has a value of from about 2 to 10. The general formula for a molecular sieve composition known commercially as type 13X is:

$$1.0\pm0.2Na_2O:1.00Al_2O_3:2.5\pm0.5SiO_2$$

plus water of hydration. Type 13X has a cubic crystal structure which is characterized by a three-dimensional network with mutually connected intracrystalline voids accessible through pore openings which will admit molecules with critical dimensions up to 10 Å. The void volume is 51 volume percent of the zeolite and most adsorption takes place in the crystalline voids. Typical well-known zeolites which may be used include chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silica-polymorph disclosed in U.S. Pat. No. 4,061,724 and also the F-silicate disclosed in U.S. Pat. No. 4,073,865, hereby incorporated by reference. Detailed descriptions of some of the above-identified zeolites may be found in D. W. Breck, *Zeolite Molecular Sieves,* John Wiley and Sons, New York, 1974, hereby incorporated by reference. Preferably, the adsorbent is selected from the group consisting of Y-54, Y-74, Y-84, Y-85, low cerium mixed rare earth exchanged Y-84, calcined rare earth exchanged LZ-210 at a framework $SiO_2/Al_2O_3$ mol equivalent ratio of less than about 7.0 and mixtures thereof. More preferably, the adsorbent comprises a Y zeolite having a trivalent cation in the β-cage of the zeolite structure.

A heat transfer fluid such as a cold fluid to cool the adsorption zone to adsorption conditions of adsorption temperature and an adsorption pressure is introduced at a cold fluid temperature into the heat transfer zone. When required to raise the temperature of the adsorption zone to desorption conditions—such as a desorption temperature and a desorption pressure, a hot heat transfer fluid is introduced to the heat transfer zone. The cold heat transfer fluid and the hot heat transfer fluid may be selected from the group consisting of water, alcohols, ammonia, light hydrocarbons, chlorofluorocarbons, fluorocarbons, and mixtures thereof. Water is a preferred heat transfer fluid. Similarly, for sorption cooling operations, a refrigerant is selected from the group consisting of water, alcohols, ammonia, light hydrocarbons, chlorofluorocarbons, fluorocarbons, and mixtures thereof. It is preferred that the heat transfer fluids and the refrigerants not react with the materials of the heat transfer surface. Additives and inhibitors such as amines can be added to the heat transfer fluids to pacify or inhibit such reactions.

In the operation of the sorption cooling system of the present invention, a portion of the adsorbent zones may be in an adsorption mode, an intermediate mode, or a desorption mode. In the typical installation at least one bed will be active in each of the operating modes at any given time in order to provide a continuous process. Generally, the adsorption mode comprises an adsorption temperature ranging from about 0° C. to about 100° C. and an adsorption pressure ranging from about 0.7 kPa (0.1 psia) to about 1.5 M kPa (220 psia). The desorption mode comprises a desorption temperature ranging from about 80° C. to about 350° C. and a desorption pressure ranging from about 2 kPa to about 1.5 M Pa (220 psia).

The sorption zone may be operated with a variety of sorbent/refrigerant combinations or pairs. Examples of parings of such sorbent/refrigerant pairs include zeolite/water, zeolite/ethanol, zeolite/methanol, carbon/ethanol, zeolite/ammonia, zeolite/propane and silica gel/water. The operating conditions such as the evaporator temperature, the adsorption pressure, the condenser temperature and the desorption pressure will vary with the selection of the sorbent/refrigerant pair. For a zeolite/water pair, the evaporator temperature will range from about 0° C. to about 20° C., an adsorption pressure will range from about 0.5 to about 4 kPa, a condenser temperature will range from about 10–60° C. and the condenser pressure will range from about 2 kPa to about 15 kPa. For an ammonia/zeolite pair, the evaporator temperature will range from about −30 to about 10° C., the adsorption pressure will range from about 100 kPa to about 600 kPa, the condenser temperature will range from about 20 to about 60° C. and the desorption pressure will range from about 800 kPa to about 2.5 MPa. For a zeolite/methanol pair, the evaporator temperature will range from about −30 to about 10 ° C., the evaporator pressure will range from about 0.4 to about 8 kPa, the condenser temperature will range from about 20 to about 60° C., and the desorption pressure will range from about 10 to about 100 kPa.

It was discovered that when finned tubes or plates are coated after assembly by conventional methods, the physical properties such as capillary forces and viscosity of the slurry mixture employed to apply the adsorbent to the finned tube or plate surface actually determine a limit to the number tubes or plates per unit of length which can be coated without filling the space between fins and reducing the characteristic diffusion distance, or the thickness of the coating. Preferably, the fin plates comprise a material selected from the group consisting of aluminum, aluminum alloys, copper, copper alloys of steel, carbon steel, stainless steel, and combinations thereof. If the adsorbent layer is allowed to fill the space between the fins or plates, the characteristic diffusion distance becomes equal to the height of the fin from the tube. This closure of the characteristic diffusion distance slows down the kinetics of both the heat and the mass transfer of the sorption cooling process. The result is the extension of the cycle time and the introduction of a thermal wave which decreases the overall sorption cooling efficiency and reduces the specific power. It was discovered that a coating thickness of about 0.23 mm (0.009 inches) comprised the maximum thickness of an adsorbent coating or layer which could be applied to finned tubes without causing bridging of the adsorbent to occur between the fins of a finned tube. Preferably, the adsorbent coating comprises a uniform adsorbent density of about 0.8 grams per square cm of fin surface area. The real advantage of the fin plate module of the present invention is demonstrated by the number of fin plates per unit length of tube which can be fabricated without forming a build-up at the fin plate/tube juncture or between the plates. This advantage translates into an effective density for the fin plate modules which is between 6 and 8 times greater than the inside coated tubes or the outside coated finned tubes. The effective density as used herein is defined to be the loading of adsorbent per unit of swept volume of exchanger module required to support the adsorbent. As used herein the term "swept volume" is defined to be the volume of the circular cylinder that will circumscribe the coated fin plates. Thus, the swept volume of a stack of fin plates is given by the formula: $\Pi \times [(length/2)^2 + (width/2)^2] \times length$ of stack, wherein the length and width refer to the length and width of the fin plate. Surprisingly, the improved effective densities exhibited by the coated fin plate of the present invention increase the adsorbent to metal ratio of by a factor of from 4 to about 12 times that of the inside coated tubes or the outside coated fin tubes. The higher the effective density, the lower the capital cost and the higher the operating efficiency of the sorption cooling process. More preferably the stack of fin plates comprises 400 to about 800 fin plates per meter.

A process for continuous sorption cooling uses at least two sorption cooling exchanger modules. The process comprises the following steps:

a) a hot heat transfer stream is passed to a first sorption cooling exchanger module to desorb a refrigerant from an adsorbent layer containing an adsorbent selective for the adsorption of the refrigerant to provide a refrigerant vapor stream;

b) the refrigerant vapor stream is withdrawn at a desorption pressure from the first sorption cooling exchanger module and the refrigerant vapor stream is passed to a condenser wherein the refrigerant vapor stream is cooled and at least partially condensed to provide a condensed refrigerant stream;

c) the condensed refrigerant stream is passed to an isolation valve to reduce the pressure of the condensed refrigerant stream to an evaporator pressure and to provide a cooled condensed refrigerant stream;

d) the cooled condensed refrigerant stream is passed to an evaporator wherein the cooled condensed refrigerant stream is heat exchanged with an external stream to cool the external stream to provide a vaporized refrigerant stream;

e) a cold heat transfer stream is passed to the heat transfer zone of another sorption cooling exchanger module to cool the adsorbent layer and the vaporized refrigerant stream is passed to the other sorption cooling exchanger module to adsorb the vaporized refrigerant stream; and, f) steps (a) through (e) are repeated to provide a continuous sorption cooling process.

In the hereinabove described continuous sorption cooling process, preferably, the hot heat transfer stream comprises a hot temperature of about 80° C. to about 350° C. and the cold heat transfer stream comprises a cold temperature of about −10° C. to about 50° C. The refrigerant is selected from the group consisting of water, alcohols, ammonia, light hydrocarbons, chloro-fluoro-hydrocarbons, fluorocarbons, and mixtures thereof. The adsorbent comprises a solid adsorbent selected from the group consisting of silica gel, activated carbon, clays, metallic salts, zeolite molecular sieves, and mixtures thereof. Preferably, the refrigerant comprises water and the adsorbent comprises zeolite Y. The external stream comprises a plant process stream or a fluid from a conditioned space.

DETAILED DESCRIPTION OF THE DRAWINGS

With reference to FIG. 1, a sorption cooling module 10 is shown comprising a plurality of fin plates 18 stacked such that the fin plates 18 are aligned normally in relation to a longitudinal axis 16 extending through the stack of fin plates. Each of the fin plates 18 has a plurality of spaced apart apertures 12. The apertures 12 have a functional diameter and are aligned relative to the longitudinal axis 16 extending through the fin plate. The fin plates are coated on a first side and a second side opposite with an adsorbent layer to form coated fin plates. The apertures define a plurality of bores which are aligned in parallel to the longitudinal axis and through which are disposed a plurality of tubes 14. The tubes 14 have an outside diameter essentially equal to the functional diameter of the apertures and are rigidly disposed in the bores at each aperture to provide continuous contact with the fin plates to form the sorption cooling module 10. In the sorption cooling module 10, the tubes 14 define a first flow path for a heat exchange medium in the tubes and a second flow path for a refrigerant. The second flow path is normal to the longitudinal axis and between the coated fin plates.

Figure 2:
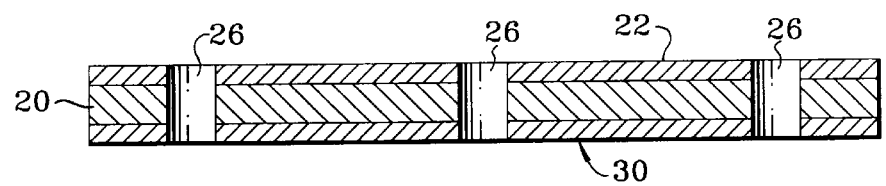
FIG. 2 is a cross-sectional view of a coated fin plate of the present invention.

FIG. 2 shows a coated fin plate 30 having a plurality of apertures 26 and comprising a metal plate 20 having an adsorbent layer 22 on a first side and a second, opposite. The adsorbent layer comprises an adsorbent. Preferably, the adsorbent is selected from the group consisting of zeolite X, zeolite Y, zeolite A, silica gel, silicas, aluminas, and mixtures thereof. More preferably, the adsorbent is selected from the group consisting of zeolite Y-54, zeolite Y-74, zeolite Y-84, zeolite Y-85, low cerium rare earth exchanged Y-84, low cerium rare earth exchanged zeolite LZ-210, and mixtures thereof. Most preferably, the adsorbent is selected from the group consisting of zeolite Y having a trivalent cation in the β-cage of the zeolite structure. The adsorbent layer may be formed by conventional coating methods such as slip coatings, dipping, spray coating, curtain coating, and combinations thereof. One preferred method of forming an adsorbent layer on the fin plate is by applying a layer of adsorbent paper such as disclosed herein above wherein the paper contains the adsorbent in a uniform layer. The adsorbent paper layer may be laminated to the fin plates by any means such as a heat and moisture resistant adhesive-like epoxy. By applying the adsorbent layer to the fin plate prior to assembly of the sorption cooling module, the build-up or flooding of adsorbent at the roof where the tube contacts the fin plate is avoided. Surprisingly, the use of the adsorbent paper layer having a layer thickness of between about 0.010 inches (0.25 mm) and about 0.020 inches (0.5 mm) results in a significantly higher effective adsorbent density than other coating methods. For layers of this thickness, stacked arrangements of fin plates having from about 300 to about 800 fin plates per meter of tube length may be assembled.

EXAMPLES

The following examples are provided for illustrative purposes and are not intended to limit the scope of the claims that follow.

EXAMPLE I

Coating irregular surfaces with molecular sieves has presented problems which limit the coating thickness and hence the weight of adsorbent which can be applied to heat transfer surfaces in sorption cooling devices. When the coating is too heavy or the layer is too thick, the heat transfer through the coating becomes limiting. When the coating methods based on applying a slurry to an irregular shape such as the inside or outside of finned tubes, gravity or viscosity effects limit even distribution and agglomeration, or build-up of material can occur at the juncture of the tube and fin which can become limiting. Table 1 presents a comparison of the effective density for sorption cooling module configurations, including inside coated tube (a), an outside coated finned tube (b), a coated fin plate of the present invention (c), and a paper laminated fin plate (d) of the present invention. The thickness of the coating represented in Table 1 is representative of a value which is not limited by convective heat transfer through the adsorbent coating. The thickness of the adsorbent layers varied from about 0.08 inches (2 mm) for inside coated, finned tubes. The use of fin plates permits coating thickness to vary from about 0.01 inches (0.25 mm) to about 0.02 inches (0.50 mm).

TABLE 1

Sorption Cooling Coating Effectiveness

|  | (a) Inside Coated Tubes | (b) Outside Coated Finned Tubes | (c) Coated Fin Plates | (d) Paper Coated Fin Plates |
|---|---|---|---|---|
| Critical Coating Thickness, inch | 0.078 | 0.009 | 0.017 | 0.020 |
| mm | 2.0 | 0.23 | 0.43 | 0.50 |
| Maximum # of Fins/Unit Length | NA |  |  |  |
| (inch) |  | ≦7 | >15 | >16 |
| (meter) |  | ≦280 | >590 | >600 |
| Effective Density | 2.5 | 3.5 | 15 | 20 |
| Adsorbent/Metal Ratio, wt/wt | 0.1 | 0.3 | 1.3 | 1 |

EXAMPLE II

The operation of a sorption cooling device of the present invention may be used with a variety of a refrigerants over a range of pressures on the refrigerant side of the process which is governed by the pressure of the saturated refrigerant vapor at the temperature conditions of the process steps of evaporation, condensation, and regeneration. Table 2 illustrates this range of saturated vapor pressures for a sorption cooling process operation for three refrigerants: a) water, b) ammonia, and c) methanol. The pressures are shown in psia, and in kPa.

TABLE 2

Saturated Vapor Pressures of Refrigerants

| Saturated Vapor Pressure at: | WATER | AMMONIA | METHANOL |
|---|---|---|---|
| Evaporation, psia | 0.08 | 30 | 0.1 |
| kPa | 0.56 | 210 | 0.7 |
| Condensation, psia | 1.0 | 200 | 3.0 |
| kPa | 7.0 | 1400 | 210 |
| Regeneration, psia | 18 | 600 | 25 |
| kpa | 126 | 4200 | 175 |

I claim:

1. A sorption cooling exchanger module comprising:
   a) a plurality of fin plates having a first and second opposing sides and an adsorbent coating covering essentially the entire surface of each opposing side to form coated fin plates and spaced apart in a stacked arrangement that eliminates adsorbent bridging between all coated surfaces and contains at least 300 coated fin plates for every meter of the stacked arrangement; and
   b) a plurality of tubes extending through openings in the fin plates wherein the outside of said plurality of tubes directly contacts the periphery of the openings to form the sorption cooling exchanger module defining a first flow path for a heat exchange medium in said plurality of tubes and a second flow path for a refrigerant between said coated fin plates.

2. The sorption cooling exchanger module of claim 1 wherein the adsorbent coating comprises a layer of paper comprising said adsorbent.

3. The sorption cooling exchanger module of claim 1 wherein the fin plates are flat and said plurality of tubes extend in a direction normal to the fin plates.

4. The sorption cooling exchanger module of claim 1 wherein the coating has a thickness of from about 0.13 mm to about 0.5 mm (0.005 to 0.020 inches) and the coated surfaces are separated by a distance of at least about 0.25 mm(0.01 inches).

5. The sorption cooling exchanger module of claim 1 wherein the outside of said plurality of tubes are uncoated.

6. The sorption cooling exchanger module of claim 2 wherein the layer of paper comprises a thickness from about 0.25 to about 0.50 millimeters (from about 10 to about 20 mils).

7. The sorption cooling exchanger module of claim 1 wherein the plurality of fin plates comprises from about 300 to about 800 fin plates per meter of tube length.

8. The sorption cooling exchanger module of claim 1 wherein the adsorbent coating comprises a layer comprising zeolite Y selected from the group consisting of zeolite Y-54, zeolite Y-74, zeolite Y-84, zeolite Y-85, low cerium rare earth exchanged Y-84, and low cerium rare earth exchanged zeolite LZ-210.

9. The sorption cooling exchanger module of claim 1 wherein the refrigerant is selected from the group consisting of water, alcohols, ammonia, light hydrocarbons, chlorofluoro-hydrocarbons, fluorocarbons, and mixtures thereof.

10. The sorption cooling exchanger module of claim 1 wherein the refrigerant comprises water and the adsorbent comprises zeolite Y.

11. The sorption cooling exchanger module of claim 1 wherein the adsorbent is contained in a paper layer and said paper layer is laminated to the first side and the second side of the fin plates.

12. The sorption cooling exchanger module of claim 2 wherein the paper layer comprises:
   a) a filler comprising fibrillated aramid and acrylic fibers; and,
   b) an adsorbent selected from the group consisting of an adsorbent selected from the group consisting of X zeolite, Y zeolite, rare earth exchanged forms of Y zeolite, and mixtures thereof.

13. The sorption cooling exchanger module of claim 1 wherein the fin plates comprise a material selected from the group consisting of aluminum, aluminum alloys, copper, copper alloys of steel, carbon steel, stainless steel, and combinations thereof.

14. The sorption cooling exchanger module of claim 1 wherein the adsorbent coating comprises a uniform adsorbent density of about 0.8 grams per square cm of fin surface area.

15. The sorption cooling exchanger module of claim 1 wherein said fin plates are disposed on said tubes in a fin density of from about 400 to about 800 fin plates per meter per length of tube.

16. The sorption cooling exchanger module of claim 1 wherein the adsorbent coating comprises an effective density greater than about 15.

17. A sorption cooling exchanger module comprising:
   a) a plurality of fin plates having a first and second opposing sides and an adsorbent coating covering essentially the entire surface of each opposing side;
   b) a plurality of openings defined by the fin plates and extending through the fin plates and coating;
   c) a plurality of tubes having uncoated outer walls, said plurality of tubes extending transversely through the fin plates and having direct contact with the fin plates being spaced apart in a stacked arrangement that eliminates adsorbent bridging between all coated surfaces and contains at least 300 fin plates for every meter of the stacked arrangement; and
   d) said plurality of tubes extending through the openings in the fin plates wherein the outside of said plurality of tubes directly contacts the periphery of the openings to form the sorption cooling exchanger module defining a first flow path for a heat exchange medium in said plurality of tubes and a second flow path for a refrigerant between said coated fin plates.

18. The sorption cooling exchanger module of claim 17 wherein the adsorbent coating comprises a layer of paper comprising said adsorbent.

19. The sorption cooling exchanger module of claim 6 wherein the fin plates are flat and said plurality of tubes extend in a direction normal to the fin plates.

20. The sorption cooling exchanger module of claim 17 wherein the coating has a thickness of from 0.13 mm to 0.5 mm (0.005 to 0.020 inches) and the coated surfaces are separated by a distance of at least 0.25 mm (0.01 inches).

21. The sorption cooling exchanger module of claim 17 wherein the diameter of the tubes is expanded within the openings to press the outside surface of the tubes into contact with the periphery of the openings.

22. The sorption cooling exchanger module of claim 6 wherein the tubes retain the spacing of the plates within the stacked arrangement.

23. A sorption cooling exchanger module comprising:
   a) a plurality of fin plates, having a first side and a second side opposite, said fin plates being spaced apart by a working distance and disposed in a stacked arrangement normal to each other, said fin plates defining a plurality of spaced apart apertures providing a plurality of bores having a common axis through the stacked arrangement, each of said bores having a functional diameter;
   b) an adsorbent coating disposed on said fin plates on the first and second sides in a uniform layer to form coated fin plates, said adsorbent coating comprising an adsorbent selected from the group consisting of zeolite X, zeolite Y, zeolite A, silica gel, silicas, aluminas, and mixtures thereof and wherein the stacked arrangement eliminates adsorbent bridging between all of the coated fin surfaces;
   c) a plurality of tubes having an outside diameter essentially equal to the functional diameter rigidly disposed in said bores to provide continuous contact with said fin plates at each bore to form the sorption cooling exchanger module defining a first flow path for a heat exchange medium in said tubes and a second flow path for a refrigerant between said coated fin plates.

24. The sorption cooling exchanger module of claim 23 wherein said common axis is parallel to the direction of fin plate stacking.

25. A process for continuous sorption cooling using at least two sorption cooling exchanger modules, said process comprising the following steps:
   a) passing a hot heat transfer stream to a first flow path of a first sorption cooling exchanger module of the at least two sorption cooling exchanger modules, to desorb a refrigerant from an adsorbent coating containing an adsorbent selective for the adsorption of the refrigerant to provide a refrigerant vapor stream, wherein said sorption cooling exchanger modules comprise a plurality of fin plates, having a first side and a second side opposite, said fin plates being spaced apart by a working distance and disposed in a stacked arrangement normal to each other, said fin plates defining a plurality of spaced apart apertures providing a plurality of bores having a common axis through the stacked arrangement, each of said bores having a functional diameter; the adsorbent coating disposed on said fin plates on the first and second sides in a uniform layer to form coated fin plates wherein the stacked arrangement essentially eliminates adsorbent bridging between all coated fin surfaces, said adsorbent coating comprising an adsorbent selected from the group consisting of zeolite X, zeolite Y, zeolite A , silica gel, silicas, aluminas, and mixtures thereof, a plurality of tubes having an outside diameter essentially equal to the functional diameter rigidly disposed in said bores to provide continuous contact with said fin plates at each bore to form the sorption cooling exchanger modules defining the first flow path for said heat transfer stream in said plurality of tubes and a second flow path for the refrigerant vapor between said coated fin plates, said sorption cooling exchanger modules having an effective density of the adsorbent coating comprising greater than about 15;
   b) withdrawing the refrigerant vapor stream at a desorption pressure from the first sorption cooling exchanger module and passing the refrigerant vapor stream to a condenser wherein the refrigerant vapor stream is cooled and at least partially condensed to provide a condensed refrigerant stream;

c) passing the condensed refrigerant stream to an isolation valve to reduce the pressure of the condensed refrigerant stream to an evaporator pressure and providing a cooled condensed refrigerant stream;

d) passing the cooled condensed refrigerant stream to an evaporator wherein the cooled condensed refrigerant stream is heat exchanged with an external stream to cool the external stream to provide a vaporized refrigerant stream;

e) passing a cold heat transfer stream to the first flow path of another sorption cooling exchanger module to cool the adsorbent coating and passing the vaporized refrigerant stream to the second flow path of the other sorption cooling exchanger module to adsorb the vaporized refrigerant stream; and, f) repeating steps (a) through (e) to provide a continuous sorption cooling process having a coefficient of performance greater than about 0.6.

26. The continuous sorption cooling process of claim 25 wherein the hot heat transfer stream comprises a hot temperature of about 80° C. to about 350° C. and the cold heat transfer stream comprises a cold temperature of about −10° C. to about 50° C.

27. The continuous sorption cooling process of claim 25 wherein the refrigerant is selected from the group consisting of water, alcohols, ammonia, light hydrocarbons, chlorofluoro-hydrocarbons, fluorocarbons, and mixtures thereof.

28. The continuous sorption cooling process of claim 25 wherein the refrigerant comprises water and the adsorbent comprises zeolite Y.

29. The continuous sorption cooling process of claim 25 wherein the external stream is a plant process stream or a fluid from a conditioned space.

* * * * *